United States Patent [19]

Yamakawa et al.

[11] Patent Number: 4,651,176
[45] Date of Patent: Mar. 17, 1987

[54] OPTICAL PRINTER HEAD AND PRINTER USING SAME

[75] Inventors: Tadashi Yamakawa, Yokohama; Yutaka Inoue, Urawa; Hiroshi Satomura, Hatogaya; Hideaki Yano, Kokubunji, all of Japan

[73] Assignee: Canon Kabushiki Kaisha, Tokyo, Japan

[21] Appl. No.: 725,808

[22] Filed: Apr. 22, 1985

[30] Foreign Application Priority Data

Apr. 25, 1984 [JP] Japan .................. 59-83466
Apr. 25, 1984 [JP] Japan .................. 59-83467

[51] Int. Cl.⁴ .................................. G09G 3/20
[52] U.S. Cl. .......................... 346/160; 350/356
[58] Field of Search ........... 346/160, 108; 350/356; 340/782, 361, 762; 359/240, 300–302; 355/8; 353/89, 90; 354/10; 357/17; 332/7.51; 362/800

[56] References Cited

FOREIGN PATENT DOCUMENTS 61381A 4/1982 Japan ...................... 358/240

Primary Examiner—Arthur G. Evans
Attorney, Agent, or Firm—Fitzpatrick, Cella, Harper & Scinto

[57] ABSTRACT

An optical printer head includes a liquid crystal shutter array assembly provided with a plurality of liquid crystal shutters operable in accordance with a signal representing information to be recorded so as to form information light for imagewisely exposing the photosensitive member. The liquid crystal shutter array assembly has a light receiving surface, with which the light emitting surface of the light emitting diode which functions as a light source is in contact or in proximity.

14 Claims, 8 Drawing Figures

OPTICAL PRINTER HEAD AND PRINTER USING SAME

BACKGROUND OF THE INVENTION

The present invention relates to an optical printer head and a printer using the same, more particularly to an optical printer head provided with a liquid crystal shutter array and a printer using such a head.

A device is conventional which includes a liquid crystal shutter array and a fluorescent lamp for illuminating it. However, this type of device involves a drawback in that a longer period of time is required from energization of the lamp to the irradiation of sufficient quantity of light, and therefore, a longer waiting period is needed before the necessary intensity of the information light is reached in the optical printer head. Additionally, the fluorescent lamps produce quite a large amount of heat, which leads to the possibility of an adverse affect to the liquid crystal shutter array assembly. Furthermore, the bulkiness of the fluorescent lamp and its accessories hinders reduction of device size. Another type of device is known as not having the above drawbacks and is shown in FIG. 1. This device employs as the light source an LED (light emitting diode) array 12 comprising a plurality of LED elements arranged in the direction perpendicular to the sheet of the drawing. The light emitted by the LED array 12 is condensed by a cylindrical lens 13 on a light receiving surface of an LCS (liquid crystal shutter) array assembly 15 comprising an LCS array which includes a plurality of LCS elements arranged in the direction perpendicular to the sheet of the drawing of FIG. 1. The cylindrical lens 13 does not have light condensing power in the longitudinal direction of the LED array 12 and the LCS array assembly 15, that is, the direction perpendicular to the sheet of the drawing. It has the light condensing power only in a plane perpendicular to the length of the arrays. The LCS array assembly 15 emits light from its light emitting surface, which is received by an imaging element array 16 comprising a plurality of short focus imaging elements having a small diameter, for example small diameter lenses or refractive index dispersing type imaging elements of small diameter which is available, for example, from Nippon Itagaras Kabushiki Kaisha, trade name SELFOC, which are arranged in the longitudinal direction of LED or LCS array, namely the direction perpendicular to the sheet of the drawing. The imaging element array 16 focuses the light on a photosensitive number which is being moved.

In this type of a printer head, the light emitted by the LED array 12, that is, the light source, is only partly used effectively. This is firstly because the liquid crystal shutter array assembly transmits only a part of linearly polarized component. This stems from the fundamental property of a liquid crystal shutter array assembly, so that it is unavoidable. The second reason is that while the cylindrical lens 13 is effective to condense the light in one dimension, it does not condense the light in the other dimension, i.e. in the longitudinal direction of the cylindrical lens 13. In other words, the light from the LED array 12 diverges in the longitudinal direction of the cylindrical lens 13 with the result that there exists a light component which can not be received by an aperture of the array 16. In addition, the cylindrical lens 13 itself absorbs a part of the light. Therefore, the significance of the condensing lens 13 is, in effect, smaller than expected. For those reasons, the exposure amount of the photosensitive member tends to be insufficient. To obviate this, an increased amount of current is supplied to the LED 12. As a result, the service life of the LED element is decreased, and the printer head is easily damaged.

Additionally, since the width of the picture element (individual LCS) array of the LCS array assembly 15 is so small that it is difficult to position each of the elements in such a manner that the light from the LED array 12 is condensed just in alignment with the width of the cylindrical lens 13. If, for example, the light from the LED array 12 impinges on the LCS array assembly 15 inclinedly, the light quantity for each of the picture elements is not uniform, resulting in non-uniform image density in the image formed on the photosensitive member. Further, the structure wherein the light from the LED array 12 is projected through the cylindrical lens 13, requires the space and optical path for the cylindrical lens 13. Therefore, the printer head is necessarily bulky, which of course makes a printer bulky, too.

SUMMARY OF THE INVENTION

Accordingly, it is a principal object of the present invention to provide an optical printer head and an optical printer wherein the above described drawbacks are removed.

It is another object of the present invention to provide an optical printer head and an optical printer wherein the light emitted by an LED element is efficiently used.

It is a further object of the present invention to provide an optical printer head and an optical printer wherein a relatively smaller amount of current is sufficient for the LED element.

It is a further object of the present invention to provide an optical printer head and an optical printer which has a smaller possibility of being damaged.

It is a further object of the present invention to provide an optical printer head and an optical printer whereby a photosensitive member can be exposed to uniform information light.

It is a further object of the present invention to provide an optical printer head and an optical printer which can be made smaller in size.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will be described in conjunction with the accompanying drawings.

Figure 2:
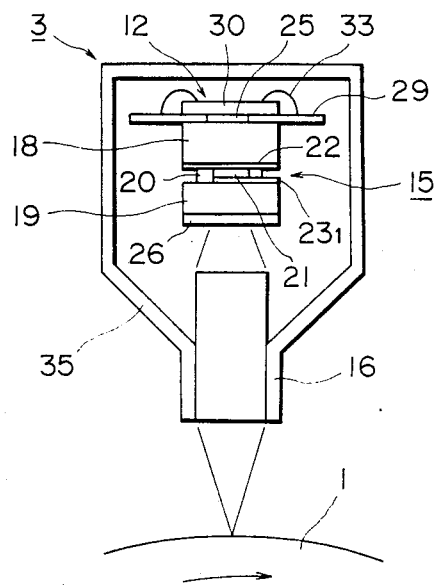
FIG. 2 is a cross-sectional view of an optical printer head according to an embodiment of the present invention.

Referring to FIG. 2, there is shown an optical printer head according to an embodiment of the present invention, comprising a liquid crystal shutter array assembly (LCS array assembly) 15 which is fixed by a bonding agent or unshown screws to a frame of an optical printer head 3.

Figure 1:
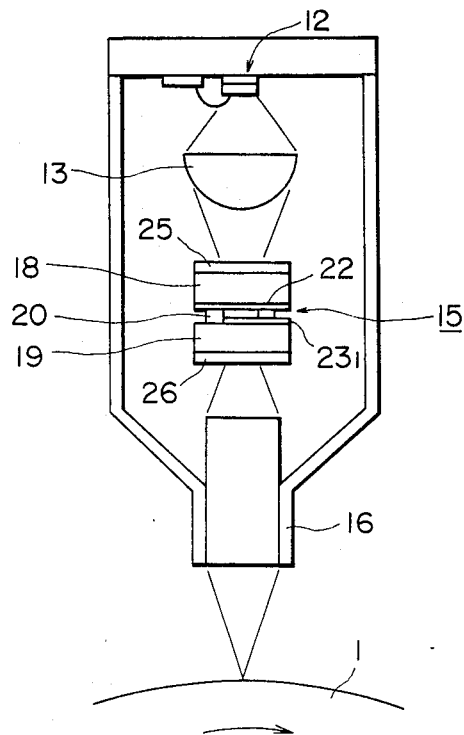
FIG. 1 is an example of an optical printer head.
Figure 3:
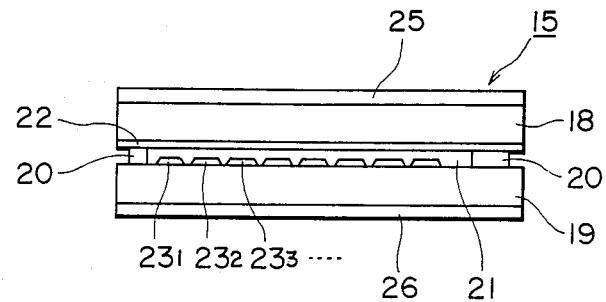
FIG. 3 is a longitudinal sectional view of an example of an LCS array assembly.

The LCS array assembly 15 includes transparent substrates 18 and 19 of glass, for example. The two transparent substrates 18 and 19 are spaced from each other by a sealing member 20 by a predetermined clearance to constitute a liquid crystal cell. The cell is filled with liquid crystal substance 21. The transparent substrate 18 is provided with a common electrode 22, while the transparent substrate 19 is provided with fine electrodes $23_1$, $23_2$, $23_3$ and so on corresponding to each of the picture elements, as shown in FIG. 3. A liquid crystal shutter (LCS) is constituted by the fine electrode, the small area of the common electrode opposed to the fine electrode and the liquid crystal sandwiched therebetween. Thus, a number of fine electrodes, and therefore, a number of liquid crystal shutters, are arranged in the direction perpendicular to the sheet of the drawing of FIG. 1, that is, the direction substantially perpendicular to the movement of a photosensitive member 1, thereby constituting an LCS array. Between the common electrode 22 and any one of the fine electrodes $23_1$, $23_2$, $23_3$ and so on, a voltage Vs of a signal representing an image to be recorded is applied. In this manner, each of the LCS elements is driven in accordance with information signals to be recorded.

To the outside of the transparent substrate 18 and the outside of the substrate 19, first and second polarization plates 25 and 26 are closely contacted, respectively. The first and second polarization plates 25 and 26 are so positioned that the directions of their polarization are orthogonal. In this embodiment, that side of the first polarization plate 25 which is opposite to the side thereof contacted to the transparent substrate 18 is a light receiving surface of the LCS array assembly 15. Similarly, that side of the second polarization plate 26 which is opposite to the side contacted to the transparent substrate 19 is a light emitting surface of the LCS array assembly 15. If the polarization plate 25 is disposed between the substrate 18 and the electrode 22, the upper side of the substrate 18 is the light receiving surface of the assembly 15. Similarly, if the polarization plate is disposed between the substrate 19 and the fine electrodes $23_1$, $23_2$, $23_3$ and so on, the bottom surface of the substrate 19 is the light emitting surface of the substrate 15. It is a possible alternative that the substrates 18 and 19 are not used, and the polarization plates 25 and 26 function as the substrates of the assembly 15.

In any case, only one of linearly polarized components of the light incident on the light receiving surface of the LCS array 15 can be transmitted through the first polarization plate 25. The polarized light transmitted through the polarization plate 25, when transmitting through the liquid crystal, rotatory-polarized in the portions of the liquid crystal corresponding to those fine electrodes which are not supplied with the image signal voltage, but is not subjected to the rotatory polarization in the portions of the liquid crystal corresponding to the electrodes supplied by the voltage. Only the rotatory-polarized component of the polarized beam transmits through the second polarization plate 26 so as to emits from the light emitting surface of the LCS array assembly 15. Thus, information light is produced from the LCS array assembly 15 in accordance with the image signals to be recorded. The information light is imaged on the surface of the photosensitive member 1 by the imaging array 16 as described hereinbefore. The imaging element array 16 is secured to the frame 35 by unshown screws, for example.

The light receiving surface of the LCS array assembly 15 receives the light emitted by the light emitting diode array 12. The light emitting diode array 12 comprises a great number of light emitting diode (LED) chips 30 arranged co-directionally with the array of the LCS elements, that is, in the longitudinal direction of the LCS array assembly 15.

Figure 4:
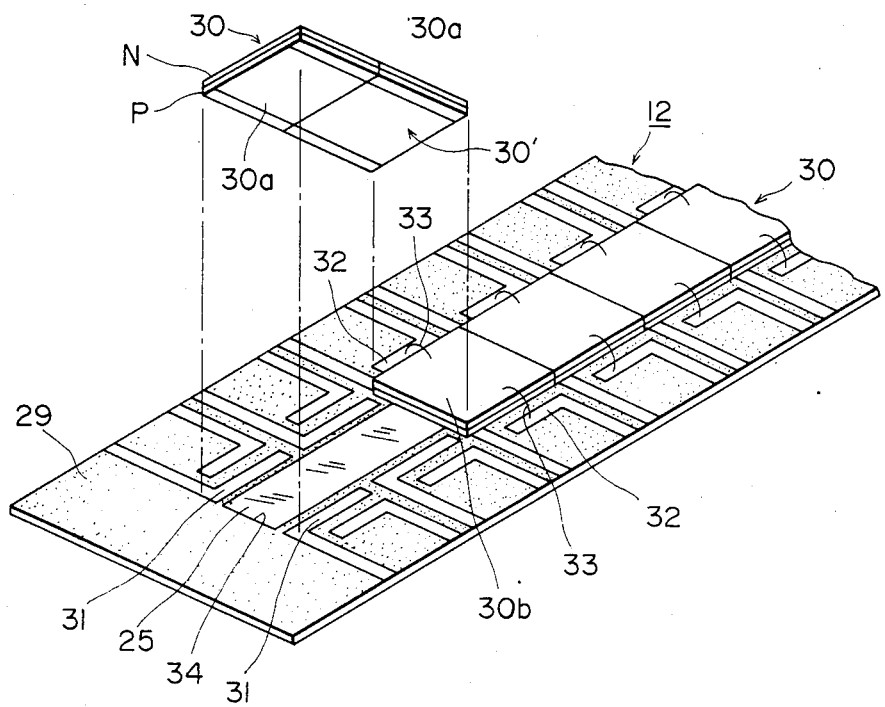
FIG. 4 is a fragmental perspective view of an LED array.

As shown in FIG. 4, the LED array 12 includes an insulating wiring substrate 29, on which an electric wiring or circuit 31 and 32 in the form of a film electrode is printed to supply electric power to each of the LED chips 30. The plurality of LED chips 30 are supported and fixed to the substrate 29 with its light emitting surface 30' (for example P layer side surface) facing downwardly. Each of the LED chips 30 has a P layer, N layer and PN junction which is an interface between the P layer and N layer. Each of the LED chips 30 is provided adjacent to the lateral ends of the light emitting surface 30' with film electrodes 30a, which are close-contacted to the wiring 31 of the substrate 29 to electrically couple each other. The opposite side of the LED chip 30 (for example, N layer side surface) is provided with a film electrode 30b over the entire surface thereof. The electrode 30b is electrically joined to the wiring 32 of the substrate 29 by way of a conductive wire 33. In this construction, when a voltage is applied between the wiring 31 and the wiring 32, the LED chip 30 produces light from the light emitting surface. The wire 33 is soldered between the wiring 32 and the electrode 30b. In place of using the wire 33, the wiring 32 and the electrode 30b may be connected by a contacting electrode or the like. The wiring substrate 29 is fixed to the frame 35 by unshown screws or the like.

The central portion of the wiring substrate 29, that is, the portion opposed to each of the light emitting surfaces of the chips 30, is removed to form an aperture 34 for introducing the light emitted from the light emitting surface of the LED chip 30 to the light receiving surface of the LCS array assembly 15. Thus, the aperture 34 is of an elongated shape extending along the array of the LED elements. The size of the first polarization plate 25 of the LCS array assembly 15 is made slightly smaller than the aperture 34 so as to be fitted therein. It is preferable that the thickness of the wiring substrate 29 is comparable to that of the polarization plate 25, since then the light emitting surface of each of the LED chips 30 and the light receiving surface of the LCS array assembly 15 can be disposed in close contact or in proximity with each other. Therefore, almost all of the light emitted by the LED array 12 can be received by the light receiving surface of the LCS array assembly 15.

In this embodiment, the wiring substrate 29 of the LED array 12 is formed by a single plate having an central portion removed to form an aperture 34. However, a plurality of substrates may be combined so as to provide central aperture 34.

Figure 5:
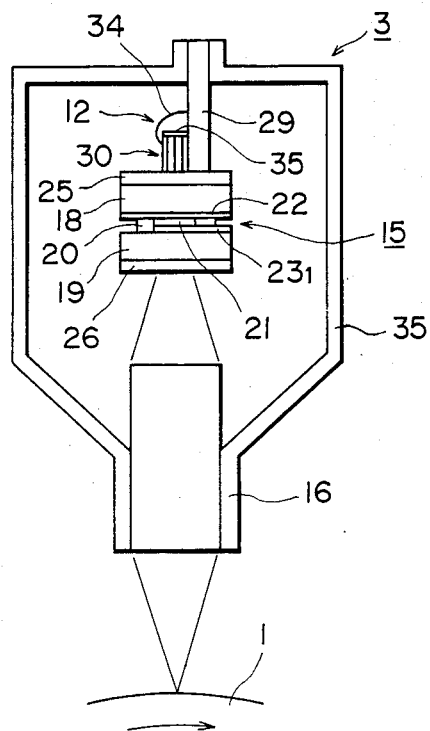
FIG. 5 is a cross-sectional view of an optical printer head according to another embodiment of the present invention.
Figure 6:
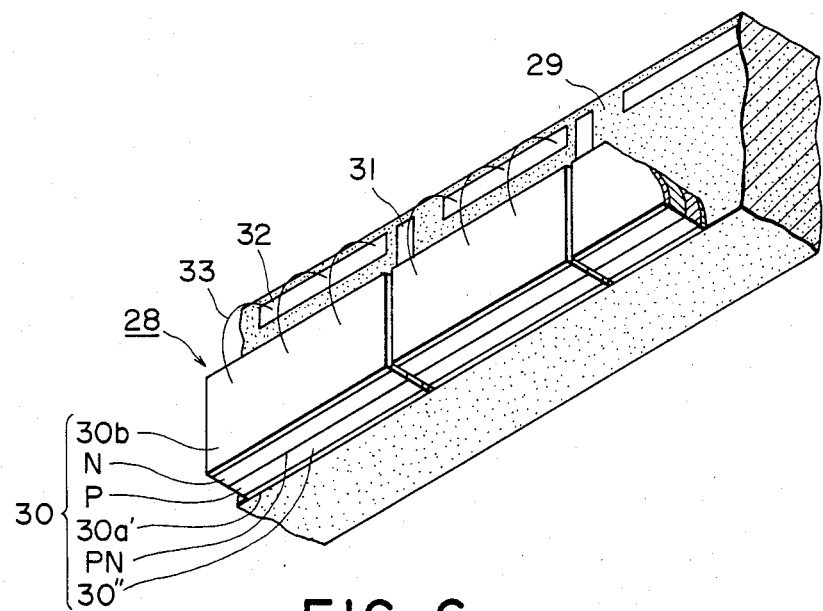
FIG. 6 is a fragmental perspective view of an LED array usable with the printer head shown in FIG. 5.

FIG. 5 is a cross-sectional view of an optical printer head according to another embodiment of the present invention, wherein a lateral end surface 30" of each of the LED chips 30, that is, the end surface of the PN junction, is close-contacted to the light receiving surface of the LCS array assembly 15. In this case, as shown in FIG. 6, a plurality of LED chips 30 are arranged and fixed on a wiring substrate 29 so as to constitute a length of LCS array. The entire outside surface of the P layer of the LED chip 30 is covered with a light reflective film electrode 30'a which is contacted to a film electrode 31 of the substrate 29. Similarly, the entire outside surface of the N layer is covered with a light reflective film electrode 30b which is electrically connected by a wire 34 to a film wire 32. The PN junction extends longitudinally as shown in the Figure. The light emitting surface is the surface 30" forming an end of the PN junction. Therefore, when the voltage is applied between the circuit 31 and the circuit 32 to produce light at the PN juntion, a part of the light component travels directly and is emitted from the end surface 30", and a part of the light component travels while being totally reflected between the two electrodes 30'a and 30b and then emitted from the end surface. The width of the end surface 30", that is, the light emitting width, is a sum of the P layer and the N layer, which amounts to several tens microns. The end surface 30" is close-contacted to the first polarization plate 25 in alignment with the picture element positions of the liquid crystal shutter array.

To an end surface (the upper surface in the Figure) of the LED chip 30 which is opposite to the end surface faced to the liquid crystal shutter array assembly 15, a reflecting plate 35 of insulating material may be provided. Then, the amount of light incident from the LED chip 30 to the LCS array assembly 15 increases further.

In the above-described arrangements, the arrangement wherein the light emitting surface of the LED chip 30 and the light receiving surface of the LCS array assembly 15 are close-contacted, is most preferable because then the light from the LED is most efficiently used. However, a small clearance may be provided between the light emitting surface of the LED chip 30 and the light receiving surface of the LCS array assembly 15. The clearance is preferably as small as possible, but a clearance of not more than 3 mm is acceptable. A clearance of not more than 2 mm is more preferable. If there is a fine clearance between the light emitting surface of the LED chip 30 and the light receiving surface of the LCS array assembly 15, it is preferable to dispose a spacer between the light emitting surface of the LED chip 30 and the light receiving surface of the LCS array assembly 15 so as to provide a uniform distribution of light in the longitudinal direction of the light receiving surface.

Figure 7:
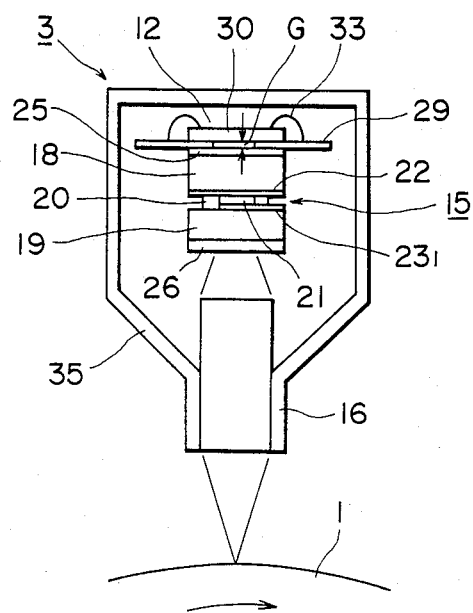
FIG. 7 is a cross-sectional view of a printer head according to another embodiment of the present invention.

FIG. 7 illustrates a further embodiment of the present invention. In this embodiment, the wiring substrate 29 is contacted to the light emitting surface of the LED chip 30 and the light receiving surface of the LCS array assembly 15 so that the clearance G formed between the light emitting surface of the LED array 12 and the light receiving surface of the LCS array assembly 15 is substantially constant along the length of the array. In other words, the wiring substrate 29 functions also as a spacer in this embodiment of FIG. 7. However, it is possible that a separate spacer member may be used which are contacted both to the LED array 12 and the LCS array assembly 15 so that the fine clearance G formed between the light emitting surface of the LED array 12 and the light receiving surface of the LCS array assembly 15 is constant along the length of the array. As for such a spacer member, a transparent glass plate may be used which is disposed in the clearance G in contact with the light emitting surface of the LED array 12 and the light receiving surface of the LCS array assembly 15.

Figure 8:
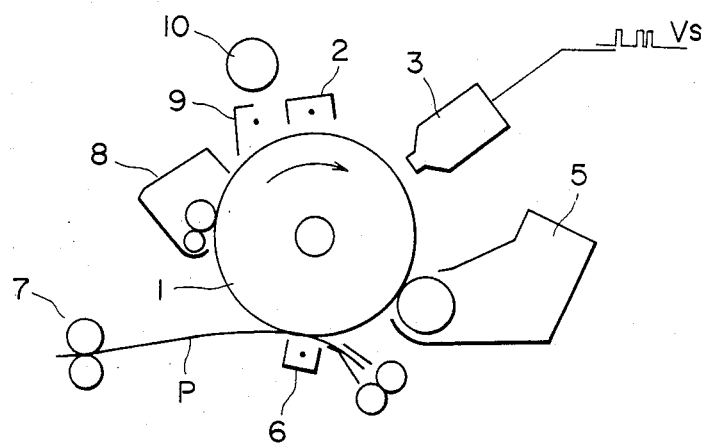
FIG. 8 is a somewhat schematic general arrangement of an optical printer incorporating the optical printer head according to the present invention.

FIG. 8 illustrates a printer usable with the printing head according to the present invention. As shown, the printer comprises a photosensitive member 1 rotatable in the direction indicated by an arrow. The photosensitive member 1 is uniformly charged by a charger 2 in the charging station. The photosensitive member 1 is then exposed in the exposure station to the information light produced by the optical printer head 3, so that an electrostatic latent image is formed on the photosensitive member 1 in accordance with the image signal Vs to be recorded.

The electrostatic latent image thus formed is developed with toner supplied from a developing device 5 in the developing station. The developed toner image is transferred onto a transfer sheet of paper P by a transfer charger 6 in the transfer station. The toner image transferred to the transfer paper P is fixed by a fixing device 7 so that a hard copy is provided. On the other hand, the toner remaining on the photosensitive member 1 after the image transfer operation is removed by a cleaning device 8 from the photosensitive member 1 in the cleaning station. Then, the electric charge remaining on the photosensitive member 1 is removed by a discharger 9 and a light source 10, whereby the photosensitive member is ready for the next image forming operation.

As described above, according to the present invention, the light emitting surface of the LED and the light receiving surface of the LCS array assembly are closely contacted or in proximity with each other, so that the light produced by the LED can be received by the light receiving surface of the LCS array assembly without passing through a cylindrical lens which is a condensing lens, whereby the light emitted from the LED is efficiently used with the result of a good quality image. In addition, the size of the printer head, and therefore, that of the printer can be reduced.

While the invention has been described with reference to the structures disclosed herein, it is not confined to the details set forth and this application is intended to cover such modifications or changes as may come within the purposes of the improvements or the scope of the following claims.

What is claimed is:

1. An optical printer head for forming information light corresponding to a signal representing information to be recorded by exposing a photosensitive member to the information light, the printer head comprising:
   a liquid crystal shutter array having a light receiving surface, a light emitting surface and a plurality of liquid crystal shutters disposed between said light receiving surface and said light emitting surface and operable in accordance with the information signal;
   a plurality of light emitting diode elements, each having a surface for emitting light in close contact or in proximity with said light receiving surface of said liquid crystal shutter array; and a wiring substrate to which said light emitting diode elements are fixed at the sides thereof having said surfaces for emitting light, said wiring substrate including electric lines for supplying current to said light emitting diode elements, wherein said wiring substrate is disposed between said light emitting diode elements and said liquid crystal shutter array and has an aperture for allowing said light emitting surfaces of said light emitting diode elements to face said light receiving surface of said liquid crystal shutter array.

2. An optical printer head for forming information light corresponding to a signal representing information to be recorded by exposing a photosensitive member to the information light, the printer head comprising:

a liquid crystal shutter array having a light receiving surface, a light emitting surface and a plurality of liquid crystal shutters disposed between said light receiving surface and said light emitting surface and operable in accordance with the information signal; and a plurality of light emitting diode elements, each having a PN junction with a surface for emitting light in close contact or in proximity with said light receiving surface of said liquid crystal shutter array.

3. An optical printer comprising an electrophotographic photosensitive member rotatable past a charging station, an exposure station, a developing station and an image transfer station in the order named, and an optical printer head for exposing said photosensitive member to information light corresponding to a signal representing information to be recorded at the exposure station to form an electrostatic latent image on said photosensitive member, wherein said optical printer head comprises:

a liquid crystal shutter array having a light receiving surface, a light emitting surface and a plurality of liquid crystal shutters disposed between the light receiving surface and the light emitting surface and operable in accordance with the information signal;

a plurality of light emitting diode elements, each having a surface for emitting light in close contact or in proximity with said light receiving surface of said liquid crystal shutter array; and a wiring substrate to which said light emitting diode elements are fixed at the sides thereof having said surfaces for emitting light, said wiring substrate including electric lines for supplying current to said light emitting diode elements, wherein said wiring substrate is disposed between said light emitting diode elements and said liquid crystal shutter array and has an aperture for allowing said light emitting surfaces of said light emitting diode elements to face said light receiving surface of said liquid crystal shutter array.

4. An optical printer comprising an electrophotographic photosensitive member rotatable past a charging station, an exposure station, a developing station and an image transfer station in the order named, and an optical printer head for exposing said photosensitive member to information light corresponding to a signal representing information to be recorded at the exposure station to form an electrostatic latent image on said photosensitive member, wherein said optical printer head comprises:

a liquid crystal shutter array having a light receiving surface, a light emitting surface and a plurality of liquid crystal shutters disposed between said light receiving surface and said light emitting surface and operable in accordance with the information signal; and a plurality of light emitting diode elements, each having a PN junction with a surface for emitting light in close contact or in proximity with said light receiving surface of said liquid crystal shutter array.

5. An optical printer head according to claim 1, wherein said light receiving surface of said liquid crystal shutter array is inserted in said aperture of said wiring substrate.

6. An optical printer head according to claim 1, wherein an electrode is fixed proximate to a lateral side of said light emitting surface of each said light emitting diode element, said electrode being in contact with said electric line of said wiring substrate.

7. An optical printer head according to claim 2, wherein each of the surfaces sandwiching said PN junction of said light emitting diode elements is provided with a film electrode having a light reflective property.

8. An optical printer head according to claim 1, further comprising a spacer member in contact with said liquid crystal shutter array and said light emitting diode elements to maintain a predetermined clearance between said light receiving surface of said liquid crystal shutter array and said light emitting surface of each said light emitting diode element.

9. An optical printer head according to any one of claims 1, 5, 6, 8, 2 and 7, further comprising an array of imaging elements for receiving light emitted from said light emitting surface of said liquid crystal shutter array and for projecting the light onto the photosensitive member.

10. An optical printer according to claim 3, further comprising an array of imaging elements for receiving light emitted from said light emitting surface of said liquid crystal shutter array and for projecting the light onto said photosensitive member.

11. An optical printer according to claim 3, wherein said light receiving surface of said liquid crystal shutter array is inserted in said aperture of said wiring substrate.

12. An optical printer according to claim 11, wherein an electrode is fixed proximate to a lateral side of said light emitting surface of each said light emitting diode element, said electrode being in contact with said electric line of said wiring substrate.

13. An optical printer according to claim 4, wherein each of the surfaces sandwiching said PN junction of the light emitting diode elements is provided with a film electrode having a light reflective property.

14. An optical printer according to claim 3, further comprising a spacer member in contact with said liquid crystal shutter array and said light emitting diode elements to maintain a predetermined clearance between said light receiving surface of said liquid crystal shutter array and said light emitting surface of each said light emitting diode element.

* * * * *

UNITED STATES PATENT AND TRADEMARK OFFICE
CERTIFICATE OF CORRECTION

PATENT NO. : 4,651,176

DATED : March 17, 1987

INVENTOR(S) : TADASHI YAMAKAWA, ET AL.

It is certified that error appears in the above-identified patent and that said Letters Patent is hereby corrected as shown below:

COLUMN 1

Line 20,   "affect" should read --effect--.
    Line 50,   "number" should read --member--.

COLUMN 4

Line 2,    "crystal," should read --crystal, is--.
    Line 10,   "emits" should read --emit--.

COLUMN 5

Line 2,    "an" should read --a--.
    Line 25,   "juntion," should read --junction,--.

Signed and Sealed this

Twenty-fifth Day of August, 1987

Attest:

DONALD J. QUIGG

Attesting Officer           Commissioner of Patents and Trademarks